(12) United States Patent
Nishimura et al.

(10) Patent No.: US 8,682,334 B2
(45) Date of Patent: Mar. 25, 2014

(54) SYSTEM AND METHOD FOR INCREASING AREA DENSITY OF TERRESTRIAL BROADCAST STATIONS

(75) Inventors: Ken A Nishimura, Fremont, CA (US); Jayendra Das, Pleasanton, CA (US); Jogesh Warrior, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1291 days.

(21) Appl. No.: 11/421,426

(22) Filed: May 31, 2006

(65) Prior Publication Data

US 2007/0281622 A1    Dec. 6, 2007

(51) Int. Cl.
| H04B 1/00 | (2006.01) |
| H04B 7/00 | (2006.01) |
| H04W 4/00 | (2009.01) |
| H04W 36/00 | (2009.01) |
| H04W 40/00 | (2009.01) |
| H04J 1/00 | (2006.01) |

(52) U.S. Cl.
USPC .......... 455/446; 455/69; 455/422.1; 455/436; 370/331; 370/338; 370/343

(58) Field of Classification Search
USPC ......... 370/331, 334, 335, 340, 390, 538, 310, 370/315, 320, 328, 338, 343, 344, 346, 370/347; 455/62, 67.11, 134, 135, 179.1, 455/182.3, 424, 436, 437, 446, 448, 522, 455/523, 524, 525, 3.02, 452.2, 67.13, 455/161.1–161.3, 33.1, 33.2, 33.4, 56.1, 69, 455/118, 126, 422.1, 432.1, 440, 442, 455/452.1, 453, 456.1, 500, 501, 562.1, 455/161.1–161.3; 348/21, 606–608, 348/634–636, 680, 693–697, 723–724, 731, 348/E5.012, E5.093; 379/58, 59, 60, 63
See application file for complete search history.

(56) References Cited

U.S. PATENT DOCUMENTS

| 5,432,842 A * | 7/1995 | Kinoshita et al. ............ 455/440 |
| 5,491,837 A * | 2/1996 | Haartsen ........................ 455/62 |
| 5,509,051 A * | 4/1996 | Barnett et al. ................ 455/443 |
| 5,548,812 A * | 8/1996 | Padovani et al. .............. 455/442 |
| 5,708,969 A * | 1/1998 | Kotzin et al. .................. 455/423 |
| 5,862,477 A * | 1/1999 | Wellard et al. ................ 455/423 |
| 5,950,127 A * | 9/1999 | Nitta et al. .................... 455/428 |
| 6,370,383 B1 * | 4/2002 | Leatham et al. .............. 455/446 |
| 6,757,520 B2 * | 6/2004 | Attar et al. .................... 455/63.1 |
| 7,170,873 B1 * | 1/2007 | Cisar et al. .................... 370/334 |
| 7,190,958 B1 * | 3/2007 | Yarkosky ...................... 455/436 |
| 2003/0003918 A1 * | 1/2003 | Proctor et al. ................ 455/446 |
| 2004/0157610 A1 * | 8/2004 | Black et al. ................... 455/443 |
| 2004/0228305 A1 * | 11/2004 | Grieco .......................... 370/335 |
| 2005/0020256 A1 * | 1/2005 | Peikari ........................ 455/422.1 |
| 2006/0128372 A1 * | 6/2006 | Gazzola ........................ 455/424 |
| 2007/0054624 A1 * | 3/2007 | Kashiwagi ................. 455/67.13 |

* cited by examiner

Primary Examiner — Ping Hsieh
Assistant Examiner — Paul P Tran (57) ABSTRACT

The area density of broadcast stations having respective service areas and broadcasting on the same channel is increased without exceeding a specified level of co-channel interference within the service areas by a method in which the field strength of the signal transmitted by the first broadcast station is monitored, and a field strength determining property of the first broadcast station is controlled in response to the monitoring.

26 Claims, 7 Drawing Sheets

SYSTEM AND METHOD FOR INCREASING AREA DENSITY OF TERRESTRIAL BROADCAST STATIONS

BACKGROUND

In the United States, the Federal Communications Commission (FCC) is charged with allocating and regulating the use of RF spectrum for radio and television broadcasting. Corresponding entities exist in other countries. The portions of the RF spectrum allocated for various types of terrestrial broadcasting are divided into channels having a defined bandwidth. For example, in the United States, the frequency-modulation (FM) broadcast band that extends from 88 to 108 MHz is divided into 100 channels with center frequencies starting at 88.1 MHz and ending at 107.9 MHz. Each channel has a bandwidth of 200 kHz. Similarly, the amplitude modulation (AM) broadcast band is divided into 10 kHz-wide channels extending from 530 kHz to 1710 kHz. Television (TV) broadcasting is accomplished using 6 MHz-wide channels in three bands extending from 54 MHz to 88 MHz (with a gap between 72 MHz and 76 MHz), 174 to 216 MHz and 470 to 806 MHz.

Available channels are allocated to broadcast stations geographically. Each broadcast station is assigned a service area to cover, typically a city or metropolitan area. The radiated power, antenna height and antenna radiation pattern of the broadcast station are specified such that the signal transmitted by the broadcast station provides a field strength greater than a threshold field strength throughout its service area.

In many areas, the availability of broadcast licenses is limited by the available spectrum. This is especially true in the FM and TV bands. Increasing the number of available channels by expanding the frequency range of the band is not practicable due to adjacent bands being used by other services and the tremendous number of existing receivers that can tune only the existing channels.

Accordingly, to increase the choice of broadcast programming available in many areas, what is needed is a way to increase the area density of broadcast stations in such areas without increasing the frequency ranges of the broadcast bands in which the broadcast stations operate and without an increased incidence of co-channel interference in the service areas of the broadcast stations.

DETAILED DESCRIPTION

The availability of channel allocations in a given area, and hence the area density of broadcast stations, is typically limited by co-channel interference prevention. The FCC uses various criteria to determine the minimum distance between broadcast stations operating on the same channel. For example, 47 CFR §73.207 defines the minimum distance separation between broadcast stations operating on the same channel in the FM band as a function of transmitter power, antenna height and antenna pattern. Similar regulations exist for the AM broadcast stations and TV broadcast stations. Similar regulations exist in other countries.

Although FM and TV broadcast stations use carrier frequencies whose propagation is typically described as "line of sight," propagation of the signals transmitted by such broadcast stations varies substantially with atmospheric conditions. Extensive studies have been conducted on the propagation characteristics of RF transmissions. Examples of such studies include those resulting in the Longley-Rice models. Due to the time-varying nature of propagation conditions, such studies usually generate probability functions, i.e., definitions of the probability that a given RF transmission will provide a defined field strength at a particular distance from the broadcast station. The FCC uses a 99 percent criterion with respect to co-channel interference, and defines a minimum distance separation between broadcast stations on the same channel such that co-channel interference will not exceed a specified level within the service areas of the broadcast stations. Specifically, the minimum distance separation is defined such that co-channel interference will occur in the service areas of the broadcast stations less than 1 percent of the time.

The minimum distance separation specification set by the FCC for broadcast stations on the same channel is a static value based on a set of static assumptions such as radiated power, antenna radiation pattern, antenna height and a 99th percentile propagation probability function. Because of the conservative assumption made with regard to the propagation characteristics of the signals transmitted by the broadcast stations, the specified minimum distance separations are greater than necessary under typical propagation conditions. Consequently, for the vast majority of the time, broadcast stations are spaced further apart than is necessary to prevent co-channel interference within each other's service areas. This results in a relatively low area density of broadcast stations and an inefficient use of the available spectrum. However, a channel allocation model based on a conservative estimate of propagation conditions has until now been the only practical way to allocate transmission channels while preventing co-channel interference.

Figure 1A:
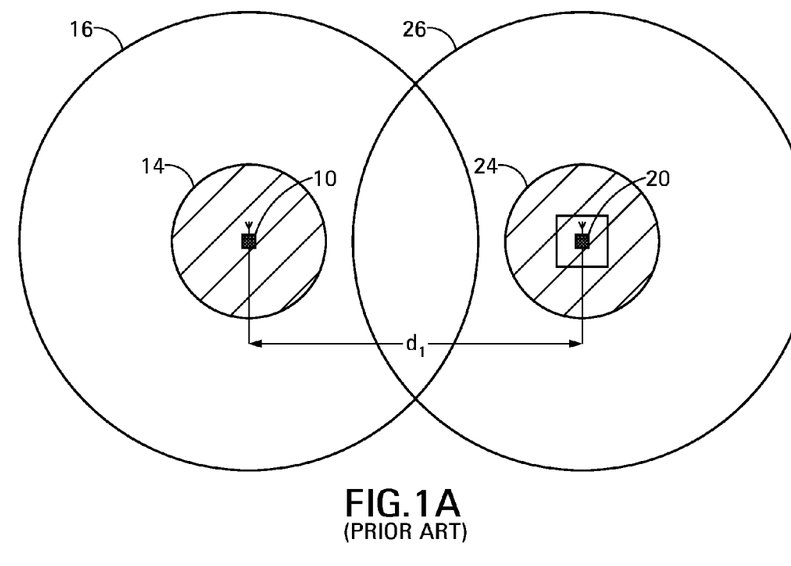
FIG. 1A is a map showing two television broadcast stations located in accordance with the FCC minimum distance separation specified in 47 CFR §73.610.

FIG. 1A is a map showing two television broadcast stations located in accordance with the FCC minimum distance separation specified in 47 CFR §73.610. In the example shown in FIG. 1A, the terrain in which the broadcast stations are located is substantially flat. Flat terrain simplifies the following description, but the following description also applies to broadcast stations located in terrain that is not flat. In the example shown in FIG. 1A, a broadcast station 10 serves a service area 14. The service area of a broadcast station is an area in which the signal transmitted by the broadcast station has a field strength greater than a threshold field strength. In the so-called Grade A service area of the broadcast station, the threshold field strength is in the range 68-74 decibels (dB) greater than a field strength of 1 $\mu V\ m^{-1}$, i.e., 68-74 dBμ, and will be referred to herein as the Grade A threshold field strength. The actual dB figure depends on the frequency band (Low VHF, High VHF or UHF). Broadcast station 10 additionally has a so-called Grade B service area, not shown in FIG. 1A. In the Grade B service area, the field strength of the broadcast station's signal is greater than what will be referred to as a Grade B threshold field strength, which is in the range 47-64 dBμ, again depending on the frequency band.

Although the effective radiated power and directional characteristics of conventional broadcast station 10 are fixed, the field strength at any point within range of broadcast station 10 depends on the propagation conditions to which the signal broadcast by the broadcast station is subject. The effect of the propagation conditions on field strength at a given location typically increases with increasing distance of the location from broadcast station 10. FIG. 1A additionally shows at 16 what will be called the 99th percentile propagation boundary of broadcast station 10. Beyond 99th percentile propagation boundary 16, the field strength of the signal transmitted by broadcast station 10 remains below what will be referred to as a propagation boundary threshold field strength 99% of the time. The propagation boundary threshold field strength is the field strength defined by the FCC in determining its minimum distance separation specification.

FIG. 1A additionally shows a broadcast station 20 that serves a service area 24. Broadcast station 20 transmits in the same channel as broadcast station 10. The 99th percentile propagation boundary of broadcast station 20 is shown at 26. Outside 99th percentile propagation boundary 26, the field strength of the signal transmitted by broadcast station 20 remains below the propagation boundary threshold field strength 99% of the time.

The distance $d_1$ between broadcast station 20 and broadcast station 10 complies with the current FCC minimum distance separation specified in 47 CFR §73.610. Thus, in instances in which broadcast station 10 and broadcast station 20 transmit respective signals in the VHF band (channels 2-13), distance $d_1$ is greater than a minimum distance separation in the range 272-353 km, and in instances in which broadcast station 10 and broadcast station 20 transmit respective signals in the UHF band (channels 14-69), distance $d_1$ is greater than a minimum distance separation in the range 249-329 km. The FCC divides the United States into three zones, and the actual minimum distance separations depend on the zone in which the broadcast stations are located. Complying with the FCC minimum distance separation specification means that the entire service area 24 of broadcast station 20 lies outside the 99th percentile propagation boundary 16 of broadcast station 10 and that the entire service area 14 of broadcast station 10 lies outside the 99th percentile propagation boundary 26 of broadcast station 20, as shown in FIG. 1A. This allows broadcast station 10 and broadcast station 20 to transmit respective signals on the same channel, but the signal transmitted by broadcast station 10 will cause co-channel interference in the service area 24 of broadcast station 20 less than 1% of the time, and the signal transmitted by broadcast station 20 will cause co-channel interference in the service area 14 of broadcast station 10 less than 1% of the time.

Figure 1B:
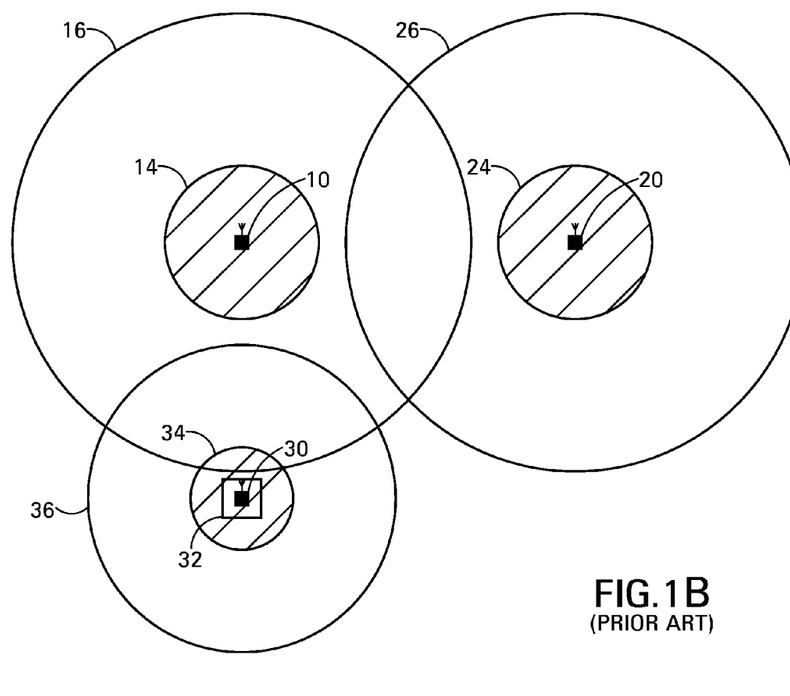
FIG. 1B is a map showing a city located outside the service area of one of the broadcast stations shown in FIG. 1A at a distance separation from such broadcast station less than the minimum distance separation specified by the FCC.

Now consider FIG. 1B, which is a map showing a city 32 located outside the service area of broadcast station 10 at a distance separation from broadcast station 10 less than the minimum distance separation specified by the FCC. In such city 32, broadcast stations (not shown) have already been licensed for the channels allocated to the city in accordance with the FCC regulations. Consequently, the choice of channels available to viewers in city 32 is maximized, but may be less than that available to viewers in the service areas served by either or both of broadcast stations 10 and 20. Moreover, a new broadcast station 30 proposed to serve city 32 may not be licensed to operate in the same channel as broadcast station 10 because the distance separation between broadcast station 30 and broadcast station 10 does not comply with the minimum distance separation specified by the FCC.

In the example shown, broadcast station 30 is proposed to operate at a lower effective radiated power than broadcast stations 10 and 20 so that the service areas 14 and 24 of broadcast stations 10 and 20 are both outside the 99th percentile propagation boundary 36 of broadcast station 30. Consequently, new broadcast station 30 would cause co-channel interference in service areas 14 and 24 less than 1% of the time. Nevertheless, broadcast station 30 cannot be allowed to operate in the same channel as broadcast station 10 because part of the service area 34 of broadcast station 30 would lie within the 99th percentile propagation boundary 16 of broadcast station 10, so that the signal transmitted by broadcast station 10 would cause co-channel interference in service area 34 more than 1% of the time. Such interference is undesirable and is not allowed by the FCC.

In an example (not shown) in which it was proposed to operate broadcast station 30 at the same effective radiated power as, or at a similar effective radiated power to broadcast station 10, broadcast station 30 could not be allowed to operate on the same channel as broadcast station 10 for the additional reason that part of the service area 14 of broadcast station 10 would lie within the 99th percentile propagation boundary 36 of broadcast station 30. As a result, broadcast station 30 would cause co-channel interference in service area 14 more than 1% of the time. Such interference is undesirable and is not allowed by the FCC.

Figure 2A:
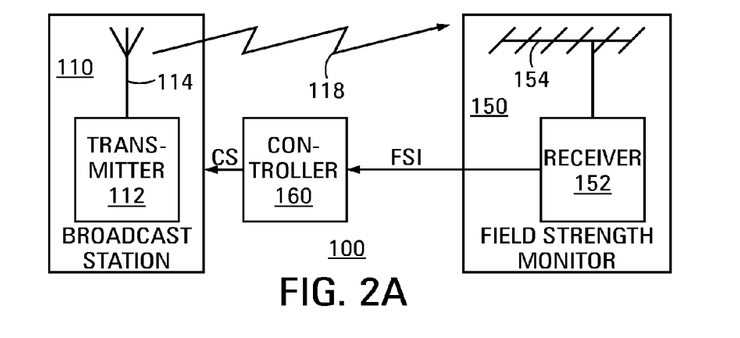
FIG. 2A is a block diagram showing an example of a system in accordance with an embodiment of the invention for reducing the minimum distance separation between broadcast stations transmitting on the same channel.
Figure 2B:
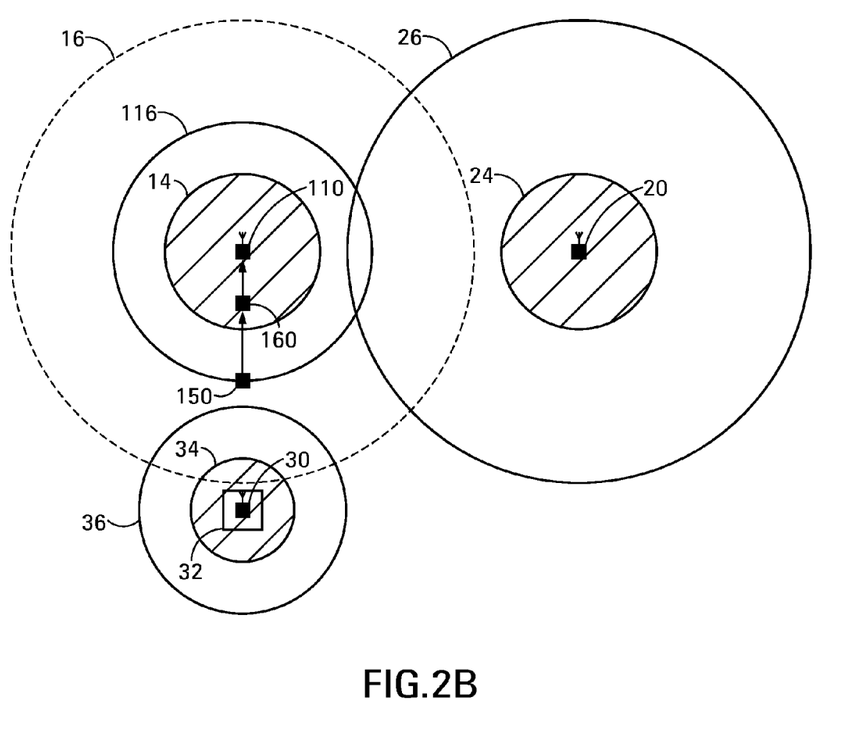
FIG. 2B is a map showing three broadcast stations located in accordance with the invention in the same area in which only two broadcast stations could be located in accordance with the FCC minimum distance separation specified in 47 CFR §73.610.

FIG. 2A is a block diagram showing an example of a system 100 in accordance with an embodiment of the invention for reducing the minimum distance separation between a first broadcast station and a second broadcast station transmitting on the same channel without exceeding a specified level of co-channel interference in the service areas of the broadcast stations. System 100 will be described with reference to an example in which it is applied to broadcast station 10 in the example described above with reference to FIG. 1B. Applying system 100 to broadcast station 10 allows broadcast station 30 to operate in the same channel as broadcast station 10. Broadcast station 10 to which system 100 is applied is indicated by the reference numeral 110. FIG. 2B is a map showing three broadcast stations located in accordance with the invention in the same area in which only two broadcast stations could be located in accordance with the FCC minimum distance separation specified in 47 CFR §73.610.

In the example shown in FIG. 2B, broadcast station 110 serves service area 14 as described above with reference to FIG. 1A. The service area of a broadcast station is an area in which the field strength of the signal transmitted by the broadcast station is greater than the above-described Grade A threshold field strength.

Also shown in FIG. 2B is broadcast station 20 that serves service area 24. Broadcast station 20 transmits in the same channel as broadcast station 110. The 99th percentile propagation boundary of broadcast 20 is indicated by a line 26. Outside 99th percentile propagation boundary 26, the field strength of the signal transmitted by broadcast station 20 remains below the above-described propagation boundary threshold field strength 99% of the time. Broadcast station 20 is situated relative to broadcast station 110 in accordance with the FCC's minimum distance separation specification so that the service area 14 of broadcast station 110 is located outside the 99th percentile propagation boundary 26 of broadcast station 20.

Finally, FIG. 2B shows broadcast station 30 that serves service area 34 including city 32 and is located at a distance from broadcast station 110 less than the minimum distance separation specified by the FCC. As described above, broadcast station 30 operates at a lower effective radiated power than broadcast station 110 so that the service area 14 of broadcast station 110 lies outside the 99th percentile propagation boundary 36 of broadcast station 30. Applied to broadcast station 110, system 100 maintains a field strength greater than the Grade A threshold field strength throughout the service area 14 of broadcast station 110 under all propagation conditions, yet prevents the signal transmitted by broadcast station 110 from propagating as far as that of conventional broadcast station 10 when propagation conditions favor long-distance propagation. The boundary of the area in which the field strength of the signal transmitted by broadcast station 110 exceeds the above-described propagation boundary field strength, which is the field strength used to define the 99th percentile propagation boundary of a conventional broadcast station, will be referred to as the propagation boundary of broadcast station 110. The propagation boundary of broadcast station 110 is indicated by a line 116 and will be referred to as propagation boundary 116.

System 100 allows broadcast station 30 and broadcast station 110 to transmit in the same channel without the co-channel interference caused by broadcast station 110 in the service area 34 of broadcast station 30 exceeding a specified level even though the distance separation between broadcast station 30 and broadcast station 110 is less than the minimum distance separation specified by the FCC. The specified level of co-channel interference can be any suitable level of co-channel interference. For example, the specified level of co-channel interference can be that specified by the FCC, namely, that co-channel interference occurs less than 1% of the time.

Referring again to FIG. 2A, system 100 comprises a field strength monitor 150 responsive to the signal transmitted by broadcast station 110. System 100 additionally comprises a controller 160 operable in response to field strength monitor 140 to control a field strength determining property of broadcast station 110.

Referring additionally to FIG. 2B, as stated above, in this example, broadcast station 30 operates at a lower effective radiated power than broadcast station 110 so that the service area 14 of broadcast station 110 is located entirely outside the 99th percentile propagation boundary 36 of broadcast station 30. Thus, the signal transmitted by broadcast station 30 will cause co-channel interference within the service area of broadcast station 110 less than 1% of the time. As described above with reference to FIGS. 1A and 1B, conventional broadcast station 10 would cause co-channel interference within the service area of broadcast station 30 more than 1% of the time. System 100 operates to prevent such co-channel interference by controlling in real time one or more of the field strength determining properties of broadcast station 110 so that signal 118 transmitted by broadcast station 110 at all times provides a field strength greater than the Grade A threshold field strength throughout service area 14 but the propagation boundary 116 of broadcast station 110 does not extend into the service area 34 of broadcast station 30. In system 100, field strength monitor 150 is located in a position where it can receive the signal 118 transmitted by broadcast station 110. Field strength monitor 150 monitors the field strength of signal 118 and provides field strength information FSI indicating the field strength of signal 118 to controller 160. In response to the field strength information, controller 160 controls a field strength determining property of broadcast station 110 in a manner that prevents the propagation boundary 116 of broadcast station 110 from extending into the service area 34 of broadcast station 30.

Under propagation conditions that are least favorable for long-distance propagation, the field strength provided by the signal 118 transmitted by broadcast station 110 is greater than the Grade A threshold field strength throughout the service area 14 of broadcast station 110. Under propagation conditions that provide nominal long-distance propagation, the field strength provided by the signal 118 transmitted by broadcast station 110 is greater than the Grade A threshold field strength throughout the service area 14 of broadcast station 110 and additionally in a region (not shown) that extends beyond service area 14. However, under such propagation conditions, the propagation boundary 116 of broadcast station 110, i.e., the boundary of the area in which the field strength provided by signal 118 exceeds the field strength corresponding to that which defines the conventional 99th percentile propagation boundary, lies well outside the service area of broadcast station 30.

Propagation conditions that provide better-than-nominal long-distance propagation cause the propagation boundary 116 of broadcast station 110 to expand outwards from broadcast station 110 towards the service area 36 of broadcast station 30, and the field strength of signal 118 detected by field strength monitor 150 to increase. Field strength monitor 150 provides the field strength information FSI indicating such increase in field strength to controller 160. In response to such field strength information, controller 160 controls a field strength determining property of broadcast station 110 to restore the field strength of signal 118 detected by field strength monitor 150 to its nominal level. As a result, system 100 reduces the tendency for propagation boundary 116 to expand outwards towards the service area 36 of broadcast station 30 as propagation conditions change to favor long-distance propagation. Keeping propagation boundary 116 well separated from the service area 36 of broadcast station 30 prevents any co-channel interference caused by signal 118 transmitted by broadcast station 110 from exceeding the specified level of co-channel interference within the service area 36 of broadcast station 30 notwithstanding propagation conditions that favor long-distance propagation.

In the example shown in FIG. 2A, broadcast station 110 comprises a transmitter 112 having an output coupled to an antenna 114, and field strength monitor 150 comprises a receiver 152 having an input coupled to an antenna 154. Receiver 152 is tuned to the channel allocated to broadcast station 110 and receives at its input the signal in that channel generated by antenna 154 in response to signal 118 transmitted by broadcast station 110. Antenna 154 and receiver 152 are structured to discriminate between signal 118 and signals on other channels received from other broadcast stations (not shown). Additionally antenna 154 and, optionally, receiver 152 are structured to discriminate between signal 118 and the signals transmitted by broadcast stations 20 and 30 on the same channel as signal 118. In the example shown, antenna 154 is highly directional and is typically aimed towards broadcast station 110. Antenna 154 may additionally be aimed to direct a null in its directional pattern towards broadcast station 30 and, optionally, to direct a null in its directional pattern towards broadcast station 20. Directional antennas are known in the art and will therefore not be described here.

Receiver 152 measures a field strength representing parameter of the signal generated by antenna 154 in response to signal 118 and transmits field strength information FSI representing the field strength representing parameter to controller 160. Typical field strength representing parameters include voltage and power. In an example in which broadcast station 110 is a television station, the field strength representing parameter is the voltage of the portion of the signal 118 corresponding to the synchronizing pulses of the television signal. In an example in which broadcast station 110 is an FM station, the field strength representing parameter is the voltage of the carrier signal. Receiver 152 may represent the field strength indicating parameter as an analog quantity or a digital value in the field strength information FSI provided to controller 160. Receivers capable of determining a field strength indicating parameter in response to a signal received from an antenna are known in the art and will therefore not be described here.

Receiver 152 transmits the field strength information FSI to controller 160 via a suitable communication link. The communication link may be a hard-wire link, an optical link, a wireless link, or another suitable link. Alternatively, the communication link may be provided by a suitable communication network of which receiver 152 and controller 160 constitute respective nodes. In one example, the communication network is a switched network, such as a telephone network. In another example, the communication network is a packet-based network such as the Internet. Since propagation conditions typically change relatively slowly, the bandwidth of field strength information FSI is relatively low. Accordingly, the communication bandwidth needed for the field strength information can be relatively low. The field strength information can be combined with other data for transmission via the communication link.

Controller 160 may be collocated with broadcast station 110 or with field strength monitor 150. Alternatively, controller 160 may be independent of broadcast station 110 and field strength monitor 150. Controller 160 extracts the field strength representing parameter from the field strength information received from field strength monitor 150 and compares the field strength representing parameter with a reference to generate a control signal CS suitable for controlling a field strength determining property of broadcast station 110. Controller 160 generates control signal CS in a sense that causes broadcast station 110 to reduce the field strength of signal 118 when the field strength representing parameter exceeds the reference, and vice versa.

In the example shown in FIG. 2B, the field strength determining property of broadcast station 110 is effective radiated power. Techniques for changing the effective radiated power of a transmitter constituting part of a broadcast station are known in the art and will therefore not be described here. A change in propagation conditions that, absent system 100, would case the propagation boundary 116 of broadcast station 110 to expand outwards towards the service area 34 of broadcast station 30 causes control signal CS to reduce the effective radiated power of broadcast station 110 to restore propagation boundary 116 to its original location. FIG. 2B additionally shows the default location of the propagation boundary of broadcast station 110 transmitting at its legal maximum power under propagation conditions most favorable for long-distance propagation. The default location corresponds to the 99th percentile propagation boundary 16 of conventional broadcast station 10 described above with reference to FIG. 1A and is therefore indicated by reference numeral 16. Controlling the effective radiated power of broadcast station 110 as described above so that broadcast station 110 transmits at less than its legal maximum power under propagation conditions that favor long-distance propagation moves the propagation boundary 116 of broadcast station 110 from default location 16 to a location substantially closer to the boundary of service area 14.

A change in propagation conditions that, absent system 100, would cause the propagation boundary 116 of broadcast station 110 to contract inwards away from service area 34 causes control signal CS to increase the effective radiated power of broadcast station 110 (subject to its legal maximum) to restore propagation boundary 116 to its original location.

Controlling the effective radiated power of broadcast station 110 in the manner described above results in broadcast station 110 transmitting at its legal maximum power only when propagation conditions are least favorable to long-distance propagation. The rest of the time, broadcast station 110 transmits at the power needed to ensure that the field strength is greater than the Grade A threshold field strength throughout service area 14. This power is typically substantially less than the legal maximum power. The lower average power of broadcast station 110 provides a substantial saving in operating costs since the average power consumption of broadcast station 110 is less than its maximum power consumption, which occurs when broadcast station is transmitting at its legal maximum power.

Figure 2C:
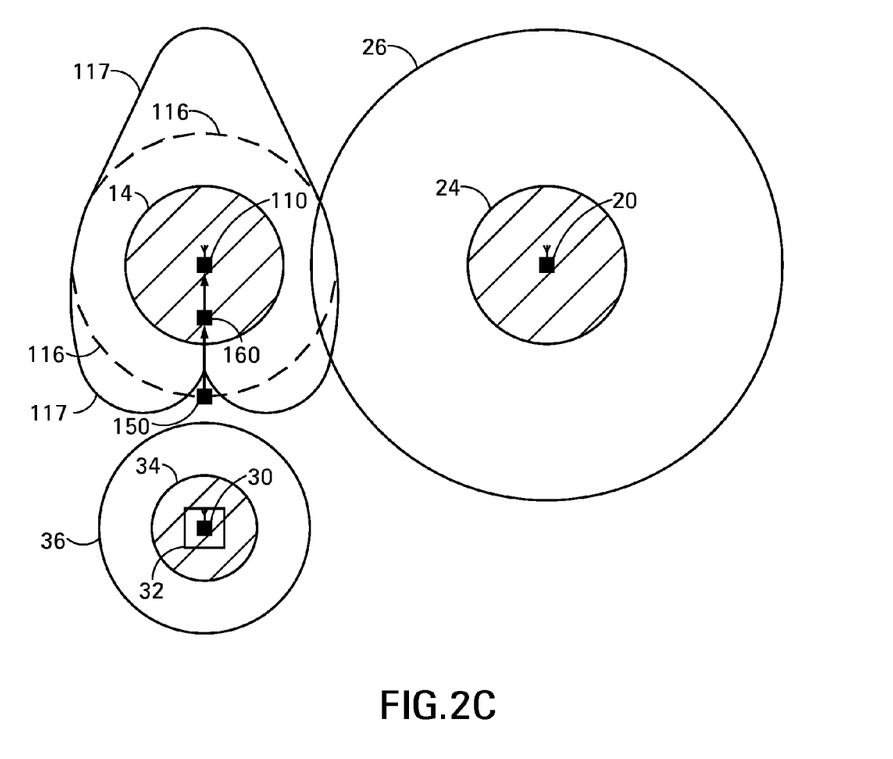
FIG. 2C is a map showing another example of the system shown in FIGS. 2A and 2B in which the field strength determining property of the broadcast station is a directional characteristic of the antenna of the broadcast station.

FIG. 2C is a map showing another example of system 100 in which the field strength determining property of broadcast station 110 is a directional characteristic of the antenna 114 (FIG. 2A) of broadcast station 110. A change in propagation conditions that, absent system 100, would case the propagation boundary 116 of broadcast station 110 to expand outwards towards the service area 34 of broadcast station 30 causes control signal CS to change the directional characteristic of antenna 114 to direct transmitted signal power away from broadcast station 30. This prevents a portion of the propagation boundary of broadcast station 110 adjacent the service area 34 of broadcast station 30 from expanding into service area 34. The modified propagation boundary resulting from the change in the directional characteristics of antenna 114 is indicated at 117. In the example shown, the change in the directional properties of antenna 114 changes the shape of the propagation boundary of broadcast station from the circle shown at 116 to the cardioid shown at 117. Other changes in the radiation pattern are possible. A change in propagation conditions that, absent system 100, would case the propagation boundary 117 of broadcast station 110 to move away from the service area of broadcast station 30 causes control signal CS to change the directional characteristic of antenna 114 to restore the portion of the propagation boundary facing broadcast station 30 to its original location shown at 116. Techniques for changing the directional characteristics of an antenna constituting part of a broadcast station are known in the art and will therefore not be described here.

In the example shown in FIG. 2C, the directional characteristic of broadcast station 110 changed by control signal CS is the azimuthal radiation pattern of broadcast station 110. Additionally or alternatively, the directional characteristic of broadcast station 110 changed by control signal can be an elevational component of the radiation pattern of broadcast station 110. Signal 118 transmitted by broadcast station 110 is refracted by what can be regarded as a refractive layer located above the earth's surface. The refraction is typically the result of an inversion layer or some other meteorological phenomenon changing the refractive index profile of the atmosphere. Long-distance propagation is favored when atmospheric conditions form the refractive layer. Conventionally, the radiation pattern of broadcast station is parallel to the local horizontal at antenna 114. When the field strength monitored by field strength monitor 150 increases, changing the directional characteristic of broadcast station 110 to introduce an elevational component into the radiation pattern of broadcast station 110 reduces the angle of incidence of signal 118 on the refractive layer and, hence, the angle of refraction of the signal. The reduced angle of refractive reduces the propagation distance of the signal. In the above description, the angle of incidence and the angle of refraction are each the angle between the respective signal and the normal to the refractive layer.

In yet another example, the field strength determining property of broadcast station 110 is both the effective radiated power of broadcast station 110 and the directional characteristic of antenna 114. Controlling both the effective radiated power and the directional characteristic is useful in terrain in which a reduction of effective radiated power sufficient to prevent the propagation boundary 116 of broadcast station 110 from extending into the service area 34 of broadcast station 30 causes the field strength in parts of the service area 14 of broadcast station 110 to fall below the specified minimum. This can be prevented by changing the directional characteristic of antenna 114 to increase the field strength in such parts.

In the examples described above with reference to FIGS. 2A-2C, broadcast station 30 operates at a lower effective radiated power than the maximum effective radiated power of broadcast station 110 so that the service area of broadcast station 110 is located outside the 99th percentile propagation boundary of broadcast station 30. An example in which city 32 is served by a broadcast station 130 that transmits on the same channel as broadcast station 110 and that operates at a maximum effective radiated power similar to that of broadcast station 110 will be described next with reference to FIGS. 3A and 3B. The distance separation between broadcast station 130 and broadcast station 110 is such that part of the service area 14 of broadcast station 110 would be located within the conventional 99th percentile propagation boundary 36 of broadcast station 130.

Figure 3A:
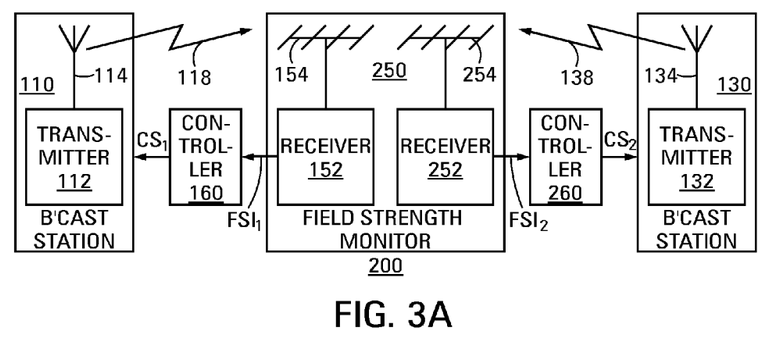
FIG. 3A is a block diagram of an example of a system in accordance with another embodiment of the invention for reducing the minimum distance separation between broadcast stations transmitting on the same channel.
Figure 3B:
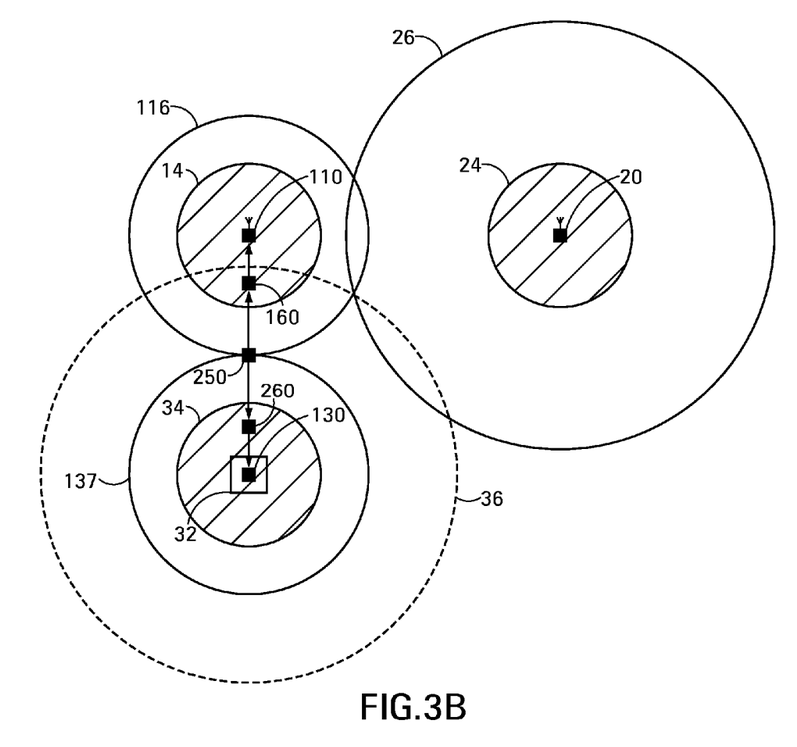
FIG. 3B is a map showing three broadcast stations located in accordance with the embodiment of the invention shown in FIG. 3A in the same area in which only two broadcast stations could be located in accordance with the FCC minimum distance separation specified in 47 CFR §73.610.

FIG. 3A is a block diagram of an example of a system 200 in accordance with another embodiment of the invention for reducing the minimum distance separation between broadcast station 110 and broadcast station 130 transmitting on the same channel and with comparable maximum effective radiated power without increasing the occurrence of co-channel interference in the service areas 14 and 34 of broadcast stations 110 and 130, respectively. FIG. 3B is a map showing broadcast stations 20, 110 and 130 located in accordance with this embodiment of the invention in the same area in which only two broadcast stations 10 and 20 could be located in accordance with the FCC minimum distance separation specified in 47 CFR §73.610. System 200 comprises a field strength monitor 250 responsive to the signals transmitted by broadcast stations 110 and 130, and controllers 160 and 260 each operable in response to field strength monitor 250 to control a field strength determining property of a respective one of broadcast station 110 and broadcast station 130.

In the example shown in FIG. 3A, broadcast station 110 is structured as described above with reference to FIG. 2A, broadcast station 130 comprises a transmitter 212 having an output coupled to an antenna 214, and field strength monitor 250 comprises receiver 152, antenna 154, a receiver 252 having an input coupled to an antenna 254. Receiver 152 and antenna 154 are described above with reference to FIG. 2A and will not be described again here. Receiver 252 is tuned to the channel allocated to broadcast station 130 and receives at its input the signal in that channel generated by antenna 254 in response to signal 138 transmitted by broadcast station 130. Antenna 254 and receiver 252 are structured to discriminate between signal 138 and signals on other channels received from other broadcast stations (not shown). Antenna 254 and, optionally, receiver 252 are additionally structured to discriminate between signal 138 and the signals transmitted by broadcast stations 20 and 110 on the same channel as signal 138. In the example shown, antenna 254 is highly directional and is typically aimed towards broadcast station 130. Antenna 254 may additionally be aimed to direct a null in its directional pattern towards broadcast station 110 and, optionally, to direct a null in its directional pattern towards broadcast station 20.

In system 200, controller 160 controls a field strength determining property of broadcast station 110 in response to the field strength information $FSI_1$ received from receiver 152 in field strength monitor 250 in a manner similar to that described above with reference to FIGS. 2A-2C. Additionally, controller 260 controls a field strength determining property of broadcast station 130 in response to field strength information $FSI_2$ received from receiver 252 in field strength monitor 250 in a manner similar to that described above with reference to FIGS. 2A-2C. Receiver 252, antenna 254 and controller 260 are similar in structure and operation to receiver 152, antenna 154 and controller 160 described above with reference to FIGS. 2A-2C and will therefore not be described in detail.

In system 200, field strength monitor 250 and controller 160 operate to generate a control signal $CS_1$ that controls a field strength determining property of broadcast station 110 as described above with reference to FIGS. 2A-2C to keep the field strength of signal 118 above the Grade A threshold field strength throughout the service area 14 of broadcast station 110 yet prevent the propagation boundary 116 of broadcast station 110 from expanding outwards into the service area 34 of broadcast station 130. Additionally, field strength monitor 250 and controller 260 operate to generate a control signal $CS_2$ that controls a field strength determining property of broadcast station 130 in a manner similar to that described above with reference to FIGS. 2A-2C to keep the field strength of signal 138 above the Grade A threshold field strength throughout the service area 34 of broadcast station 130 yet prevent the propagation boundary 136 of broadcast station 130 from expanding outwards into the service area 14 of broadcast station 110.

The field strength determining property of broadcast station 130 controlled by controller 260 may be the same as or different from the field strength determining property of broadcast station 110 controlled by controller 160.

Radio frequency signal propagation is typically more complex than the simple model underlying the embodiments described above with reference to FIGS. 2A-2C, 3A and 3B. Specifically, under some circumstances, especially when the terrain is complex, controlling the field strength determining property of a broadcast station in response to the field strength measured by single field strength monitor 150 or single field strength monitor 250 may not be fully effective in keeping the field strength above the Grade A threshold field strength throughout service area 14 yet preventing the propagation boundary 116 of broadcast station 110 from expanding outwards into the service area 34 of broadcast station 30 or the service area 34 of broadcast station 130. Under such circumstances, broadcast station 110 would cause greater than the specified level of co-channel interference in service area 34.

Figure 4A:
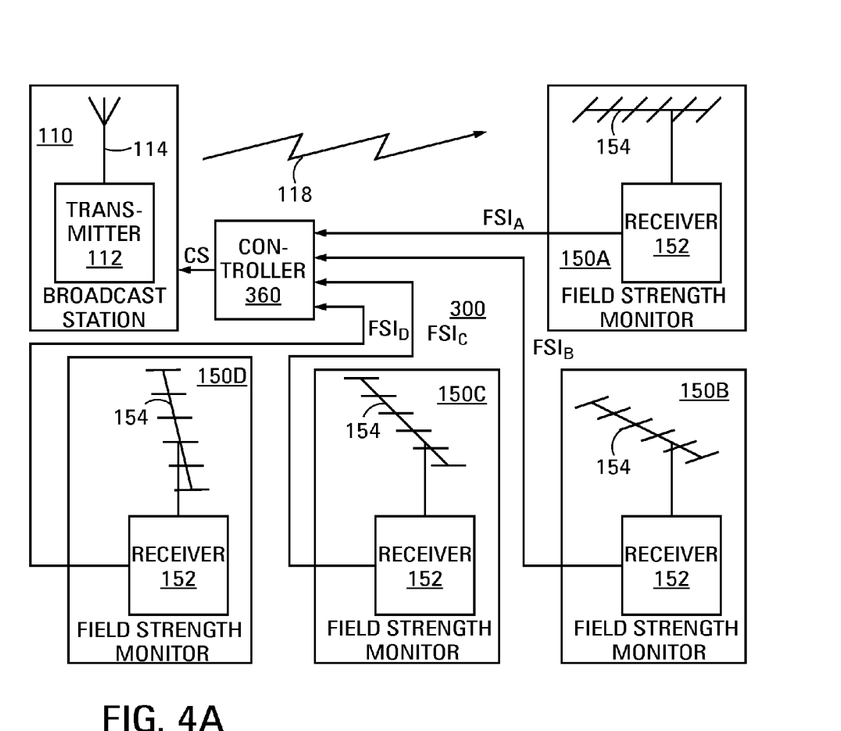
FIG. 4A is a block diagram of an example of a system in accordance with another embodiment of the invention for reducing the minimum distance separation between broadcast stations transmitting on the same channel.

FIG. 4A is a block diagram of an example of a system 300 in accordance with another embodiment of the invention for reducing the minimum distance separation between broadcast station 110 and broadcast station 30 transmitting on the same channel without exceeding a specified level of co-channel interference in the service area 34 of broadcast station 30. The example of system 300 shown is based on system 100 described above with reference to FIGS. 2A-2C in which broadcast station 30 operates at a lower effective radiated power than broadcast station 100. System 300 comprises field strength monitors that provide to the controller field strength information relating to the field strength at their respective locations of the signal transmitted by broadcast station 110. This increases the reliability with which system 300 prevents any co-channel interference that broadcast station 110 causes in the service area 34 of broadcast station 30 from exceeding the specified level of co-channel interference.

Figure 4B:
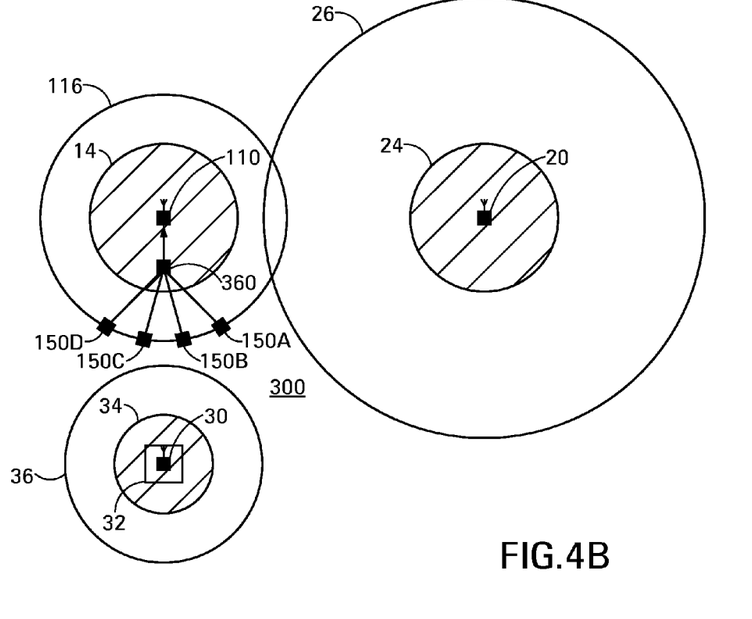
FIG. 4B is a map showing three broadcast stations located in accordance with the embodiment of the invention shown in FIG. 4A in the same area in which only two broadcast stations could be located in accordance with the FCC minimum distance separation specified in 47 CFR §73.610.

FIG. 4B is a map showing broadcast stations 20, 30 and 110 located in accordance with this embodiment of the invention in the same area in which only two broadcast stations could be located in accordance with the FCC minimum distance separation specified in 47 CFR §73.610. FIG. 4B additionally shows exemplary locations of the field strength monitors.

System 300 comprises field strength monitors 150A, 150B, 150C and 150D responsive to the signal transmitted by broadcast station 110, and a controller 360 operable in response to field strength monitors 150A-150D to control a field strength determining property of broadcast station 110. Each of the field strength monitors 150A-150D comprises a receiver 152 having an input connected to an antenna 154. In each field strength monitor, receiver 152 is tuned to the channel allocated to broadcast station 110 and receives the signal in that channel generated by antenna 154 in response to signal 118 transmitted by broadcast station 110. Antenna 154 and receiver 152 are structured to discriminate between signal 118 and signals on other channels received from other broadcast stations (not shown). Antenna 154 and, optionally, receiver 152 are additionally structured to discriminate between signal 118 and the signals transmitted by broadcast stations 20 and 30 on the same channel as signal 118. In the example shown, antenna 154 is highly directional and the antenna of each of the field strength monitors 150A-150D is typically aimed towards broadcast station 110. The antenna in each field strength monitor may additionally be aimed to direct a null in its directional pattern towards broadcast station 30 and, optionally, to direct a null in its directional pattern towards broadcast station 20. In each of the field strength monitors 150A-150D, each receiver 152 operates as described above with reference to FIG. 2A to generate field strength information $FSI_A$, $FSI_B$, $FSI_C$ and $FSI_D$, respectively, indicating the field strength of signal 118 at the location of the respective field strength monitor.

Controller 360 receives the field strength information $FSI_A$-$FSI_D$ generated by field strength monitors 150A-150D, respectively, and operates in response to field strength information $FSI_A$-$FSI_D$ to control a field strength determining property of broadcast station 110. Field strength information $FSI_A$-$FSI_D$ collectively provided by field strength monitors 150A-150D to controller 360 quantifies the field strength of signal 118 transmitted by broadcast station 110 in more locations than that provided by the single field strength monitor 150 or 250 in the embodiments described above. Accordingly, controller 360 is better able to control the field strength determining property of broadcast station 110 in a manner that maintains a defined separation between the propagation boundary 116 of broadcast station 110 and the service area 34 of broadcast station 30 yet ensures that broadcast station 110 a field strength greater than the Grade A threshold field strength throughout its own service area 14.

The field strength determining property of broadcast station 110 controlled by controller 360 may be the effective radiated power of broadcast station 110 or the directional characteristic of antenna 114, as described above. However, controller 360 controls the location of the propagation boundary 116 of broadcast station 110 and the field strength within service area 14 more effectively when it controls both the effective radiated power and the directional characteristic. This embodiment is especially useful when antenna 114 is operable to change its radiation pattern with a high degree of granularity.

Figure 5:
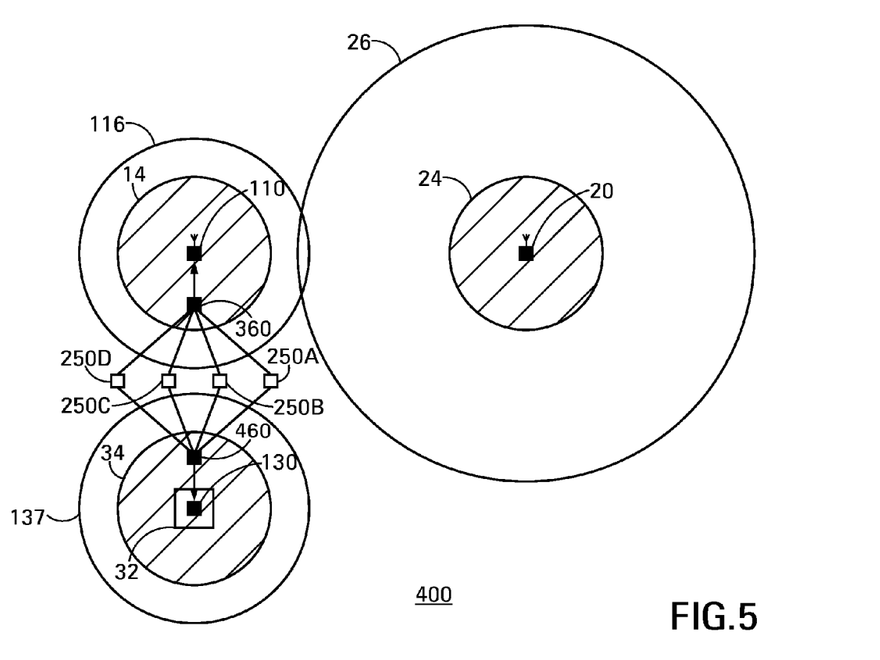
FIG. 5 is a map showing an example of a system in accordance with another embodiment of the invention for reducing the minimum distance separation between broadcast stations transmitting on the same channel.

FIG. 5 is a map showing an example of a system 400 in accordance with another embodiment of the invention for reducing the minimum distance separation between broadcast station 110 and broadcast station 130 transmitting on the same channel without exceeding a specified level of co-channel interference in the service area 14 of broadcast station 110 and exceeding a specified level of co-channel interference in the service area 34 of broadcast station 130. The example of system 400 shown is based on system 200 described above with reference to FIGS. 3A and 3B in which broadcast station 130 operates at a similar effective radiated power to that of broadcast station 110. System 400 comprises field strength monitors that provide to the controller controlling broadcast station 110 field strength information indicating the field strength at their respective locations of the signal transmitted by broadcast station 110 and that provide to the controller controlling broadcast station 130 field strength information indicating the field strength at their respective locations of the signal transmitted by broadcast station 130. This increases the reliability with which system 400 prevents any co-channel interference that broadcast station 110 causes in the service area 34 of broadcast station 130 from exceeding the specified level of co-channel interference and increases the reliability with which system 400 prevents any co-channel interference that broadcast station 130 causes in the service area 14 of broadcast station 110 from exceeding the specified level of co-channel interference.

System 400 comprises field strength monitors 250A, 250B, 250C and 250D responsive to the signal 118 (FIG. 3A) transmitted by broadcast station 110 and to the signal 138 (FIG. 3A) transmitted by broadcast station 130, a controller 360 operable in response to field strength monitors 250A-250D to control a field strength determining property of broadcast station 110 and a controller 460 operable in response to field strength monitors 250A-250D to control a field strength determining property of broadcast station 130. Each of the field strength monitors 250A-250D is similar in structure and operation to field strength monitor 250 described above with reference to FIG. 3A and will therefore not be described again here. Each field strength monitor comprises two highly directional antennas aimed towards broadcast station 110 and broadcast station 130, respectively. Field strength monitors 250A-250D are located so that they each have different bearings from broadcast station 110.

Controller 360 is described above with reference to FIGS. 4A and 4B. Controller 460 is similar in structure and operation to controller 460 and will therefore not be described in detail. Controller 460 receives the field strength information indicating the field strengths of signal 138 transmitted by broadcast station 130 at the locations of field strength monitors 250A-250D and operates in response to the field strength information to control a field strength determining property of broadcast station 130. The field strength information collectively provided by the strength monitors 250A-250D to controller 460 quantifies the field strength of signal 138 transmitted by broadcast station 130 in more locations than that provided by the single field strength monitor 250 in the embodiments described above. Accordingly, controller 460 is better able to control the field strength determining property of broadcast station 130 in a manner that maintains a defined separation between propagation boundary 136 and the service area 14 of broadcast station 110 yet ensures that broadcast station 130 provides a field strength greater than the Grade A threshold field strength throughout its own service area 34.

The field strength determining property of broadcast station 130 controlled by controller 460 may be the effective radiated power of broadcast station 130 or a directional characteristic of antenna 134 (FIG. 3A), as described above. However, controller 460 controls the location of the propagation boundary 137 of broadcast station 130 and the field strength within service area 34 more effectively when it controls both the effective radiated power and the directional characteristic.

In another embodiment of a system in accordance with the invention, multiple field strength monitors 150A-150D monitor the field strength of the signal 118 transmitted by broadcast station 110 and provide field strength information to controller 360 that controls a field strength determining property of broadcast station 110, as described above with reference to FIGS. 4A and 4B. Additionally, multiple field strength monitors similar to field strength monitors 150A-150D monitor the field strength of the signal 138 transmitted by broadcast station 130 and provide field strength information to a controller similar to controller 360 that controls a field strength determining property of broadcast station 130 in a manner similar to that described above with reference to FIGS. 4A and 4B. An example of such an embodiment will be described below with reference to FIG. 6.

In all of the above-described examples having multiple field strength monitors, four field strength monitors are shown: other examples incorporate more or fewer field strength monitors than the number shown in the above-described examples. Moreover, the number of field strength monitors monitoring the signal transmitted by each broadcast station may be different.

Dynamically controlling a field strength determining property of a broadcast station in accordance with the invention, as described above, significantly reduces the extent of the area beyond the service area of a broadcast station in which the signal transmitted by the broadcast station can cause co-channel interference when propagation conditions favor long-distance propagation. This allows the area density of broadcast stations, i.e., the number of broadcast stations in a given area, to be increased. In the examples described above, applying an embodiment of the system in accordance with the invention to broadcast station 110 allows city 32 additionally to be served by low-power broadcast station 30 (FIGS. 2A-2C) or by high maximum power broadcast station 130 (FIGS. 4A, 4B and 5) to which an embodiment of the system has been applied, both transmitting on the same channel as broadcast station 110. However, a further increase in the density of broadcast stations is possible.

Figure 6:
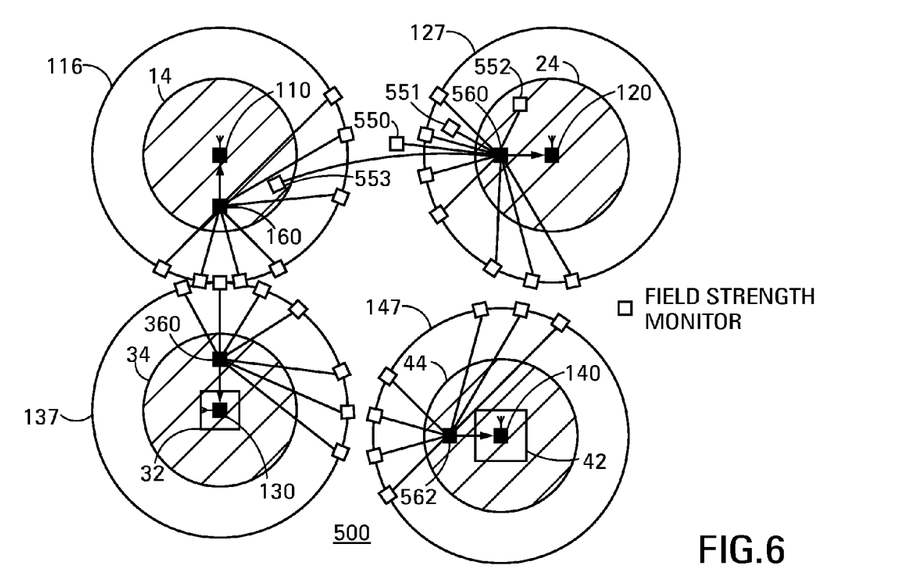
FIG. 6 is a map even showing an example in which a system in accordance with another embodiment of the invention is additionally applied to the second broadcast station shown in FIG. 1A.

FIG. 6 is a map even showing an example of a system 500 in accordance with another embodiment of the invention in which a system in accordance with an embodiment of the invention is additionally applied to a broadcast station 120 that serves the service area 24 formerly served by conventional broadcast station 20 (FIG. 1A). Broadcast station 120 transmits on the same channel as above-described broadcast station 110 and is similar in structure and operation of broadcast station 110. Multiple field strength monitors, each represented by a white-centered square, are deployed around broadcast station 120 to monitor the field strength of the signal transmitted by broadcast station 120. The field strength monitors are similar in structure and operation to field strength monitor 150, described above with reference to FIGS. 2A and 2B, and will not be described again here. The field strength monitors each provide field strength information to controller 560. The field strength information represents the field strength of the signal transmitted by broadcast station 120 at the location of each field strength monitor. Controller 560 is similar in construction and operation to controller 160 described above with reference to FIG. 2A. In response to the field strength information received from the field strength monitors, controller 560 controls a field strength determining property of broadcast station 120.

Applying system 500 to broadcast station 120 allows a broadcast station 140 serving a city 42 to be licensed to transmit on the same channel as broadcast stations 110, 120 and 130. The distance separation between broadcast station 120 and broadcast station 140 serving city 42 is less than the minimum distance separation specified by the FCC. In an embodiment (not shown) in which broadcast station 140 is a low-power station similar to broadcast station 30 described above with reference to FIGS. 2A and 2B, system 500 need not be applied to broadcast station 140 for reasons similar to those described above with reference to FIG. 2B. In the embodiment exemplified in FIG. 6, broadcast station 140 and broadcast station 120 operate at a similar effective radiated power and system 500 is additionally applied to broadcast station 140 to prevent the signal transmitted by broadcast station 140 from causing co-channel interference in the service area 24 of broadcast station 120 and in the service area 34 of broadcast station 130.

In the example shown, multiple field strength monitors, each represented by a white-centered square, are deployed around broadcast station 140 to monitor the field strength of the signal transmitted by broadcast station 140. The field strength monitors are similar in structure and operation to field strength monitor 150 described above with reference to FIGS. 2A and 2B and will not be described again here. The field strength monitors each provide field strength information to a controller 562. The field strength information provided by each field strength monitor represents the field strength of the signal transmitted by broadcast station 140 at the location of the field strength monitor. Controller 562 is similar in construction and operation to controller 160 described above with reference to FIG. 2A. In response to the field strength information received from the field strength monitors, controller 562 controls a field strength determining property of broadcast station 140.

In the example shown in FIG. 6, the locations of the field strength monitors approximately correspond to the desired locations of the propagation boundaries 116, 126, 136 and 146 of broadcast stations 110, 120, 130 and 140, respectively. The field strength monitors are additionally located along the portions of the propagation boundaries that are adjacent the service areas of the broadcast stations transmitting on the same channel. For example, some of the field strength monitors coupled to the controller 160 of broadcast station 100 are located along the portion of propagation boundary 116 adjacent the service areas 24 of broadcast station 120 and others of the field strength monitors coupled to the controller 160 are located along the portion of propagation boundary 116 adjacent the service area 34 of broadcast station 130. This allows the field strength monitors coupled to controller 160 to monitor the field strength of signal 118 (FIG. 3A) transmitted by broadcast station 110 in regions where signal 118 is most likely to cause co-channel interference in service areas 24 and 34 that exceeds the specified level of co-channel interference.

In the flat-terrain example shown in FIG. 6, the field strength monitors that monitor the field strength of the signal transmitted by each of the broadcast stations 110, 120, 130 and 140 are typically located substantially equidistant from their respective broadcast stations. Such field strength monitors will be referred to herein as equidistant field strength monitors. However, this way of locating the field strength monitors is not critical to the invention. FIG. 6 additionally shows examples of other possible locations of the field strength monitors coupled to controller 560 that controls broadcast station 120. Such field strength monitors are located closer to and/or further from broadcast station 120 than the equidistant field strength monitors coupled to controller 560. The field strength monitors in the alternative locations may be used in addition to or instead of at least some of the equidistant field strength monitors.

Specifically, FIG. 6 shows a field strength monitor 550 located further from broadcast station 120 than the equidistant field strength monitors coupled to controller 560 and a field strength monitor 551 located closer to broadcast station 120 than the equidistant field strength monitors coupled to controller 560. FIG. 6 also shows a field strength monitor 552 located in the service area of broadcast station 120 and a field strength monitor 553 located in the service area of broadcast station 110. Field strength monitors 550, 551, 552 and 553 provide to controller 560 additional field strength information regarding the field strength of the signal transmitted by broadcast station 120 within the service area 24 of broadcast station 120, within the propagation boundary 126 of broadcast station 120, outside propagation boundary 126 and within the service area 14 of adjacent broadcast station 110. Such field strength information enables controller 560 to control one or more field strength determining properties of broadcast station 120 so that, under all propagation conditions, the field strength provided by the signal transmitted by broadcast station 120 is greater than the Grade A threshold field strength throughout service area 24 without causing co-channel interference in service area 14 to exceed the specified level of co-channel interference. Field strength monitors coupled to controller 560 may additionally be sited in corresponding positions between broadcast station 120 and broadcast station 140. The field strength monitors coupled to controllers 160, 360 and 562 may also include field strength monitors situated similarly to those just described.

Figure 7A:
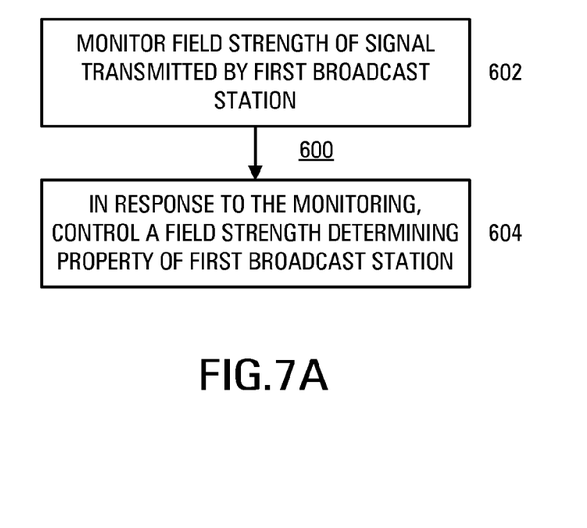
FIG. 7A is a flow chart showing an example of a method in accordance with an embodiment of the invention for increasing the area density of broadcast stations transmitting on the same channel.

FIG. 7A is a flow chart showing an example of a method 600 in accordance with an embodiment of the invention. The method is for increasing the area density of broadcast stations having respective service areas and broadcasting on the same channel without exceeding a specified level of co-channel interference within the service areas of the broadcast stations. The broadcast stations comprise a first broadcast station and a second broadcast station. In block 602, the field strength of the signal transmitted by the first broadcast station is monitored. In block 604, in response to the monitoring, a field strength determining property of the first broadcast station is controlled to maintain the field strength in the service area of the first broadcast station greater than a specified minimum and to prevent the propagation boundary of the first broadcast station from expanding into the service area of the second broadcast station. Under propagation conditions that favor long-distance propagation, the field strength determining property of the first broadcast station is controlled in response to the field strength of the signal transmitted by the first broadcast station in a manner that prevents the propagation boundary of the first broadcast station from expanding into the service area of the second broadcast station. Such expansion of the propagation boundary could result in the signal transmitted by the first broadcast station causing co-channel interference that exceeds the specified level of co-channel interference.

Examples of the field strength determining property that in block 604 is controlled in response to monitoring the field strength include the effective radiated power of the first broadcast station and a directional characteristic of the first broadcast station. The monitoring and the controlling are typically performed in real time.

Figure 7B:
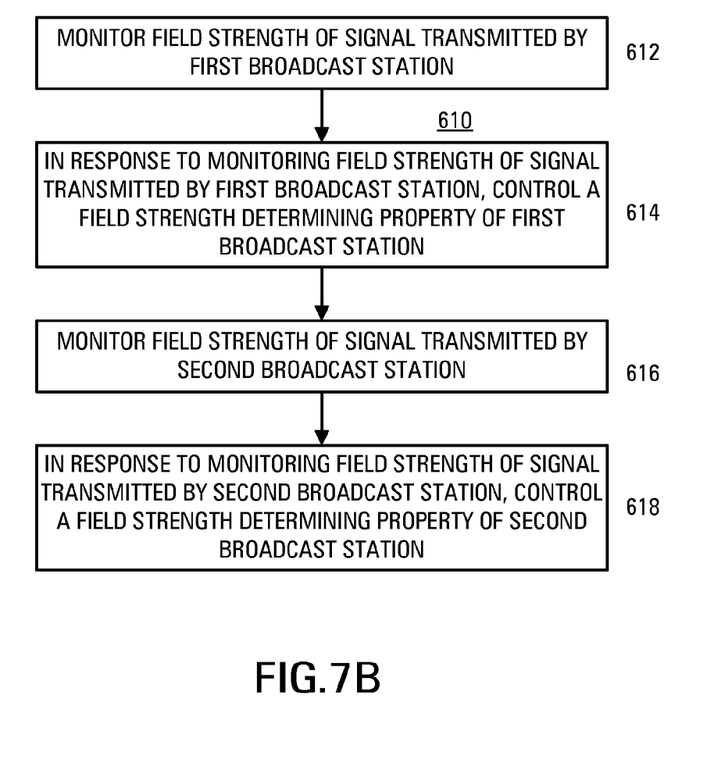
FIG. 7B is a flow chart showing an example of a method in accordance with another embodiment of the invention for increasing the area density of broadcast stations transmitting on the same channel.

FIG. 7B is a flow chart showing an example of a method 610 in accordance with another embodiment of the invention. The method is for increasing the area density of broadcast stations having respective service areas and broadcasting on the same channel without exceeding a specified level of co-channel interference within the service areas of the broadcast stations. The broadcast stations comprise a first broadcast station and a second broadcast station. In block 612, the field strength of the signal transmitted by the first broadcast station is monitored. In block 614, in response to monitoring the field strength of the signal transmitted by the first broadcast station, a field strength determining property of the first broadcast station is controlled to maintain the field strength in the service area of the first broadcast station greater than a specified minimum and to prevent the propagation boundary of the first broadcast station from expanding into the service area of the second broadcast station. In block 616, the field strength of the signal transmitted by the second broadcast station is monitored. In block 618, in response to monitoring the field strength of the signal transmitted by the second broadcast station, a field strength determining property of the second broadcast station is controlled to maintain the field strength in the service area of the second broadcast station greater than a specified minimum and to prevent the propagation boundary of the second broadcast station from expanding into the service area of the first broadcast station. Under propagation conditions that favor long-distance propagation, the field strength determining properties of the first broadcast station and the second broadcast station are controlled in response to the field strength of the signal transmitted by the respective broadcast stations in a manner that prevents the propagation boundary of each broadcast station from expanding into the service area of the other broadcast station.

The field strength of the signal transmitted by the first broadcast station and the field strength of the signal transmitted by the second broadcast station may be monitored at a common location, as in the example described above with reference to FIGS. 3A and 3B. Alternatively, the field strength of the signal transmitted by the first broadcast station and the field strength of the signal transmitted by the second broadcast station may be monitored at different locations, as in the example described above with reference to FIG. 6. In embodiments in which the field strength of the signal transmitted by at least one of the broadcast stations is monitored at multiple locations, the field strength of the signals transmitted by more than one of the broadcast stations may be monitored at some of the locations and the field strength of the signal transmitted by only one of the broadcast stations may be monitored at others of the locations.

Embodiments are described above with reference to examples in which a field strength greater than the Grade A threshold field strength is maintained throughout the service area of a broadcast station. However, in other examples, a field strength greater than another suitable threshold field strength, such as the Grade B threshold field strength, is maintained. Embodiments are described above with reference to examples in which the propagation boundary is defined in terms of the field strength used to define the conventional 99th percentile propagation boundary. However, in other examples, the propagation boundary is defined in terms of another suitable field strength.

This disclosure describes the invention in detail using illustrative embodiments. However, the invention defined by the appended claims is not limited to the precise embodiments described.

We claim:

1. A method for increasing the area density of broadcast stations having respective service areas and broadcasting on the same channel without exceeding a specified level of co-channel interference within the service areas, the broadcast stations comprising a first broadcast station and a second broadcast station, the method comprising:
monitoring the field strength of the signal transmitted by the first broadcast station, wherein the monitoring comprises monitoring the field strength of the signal transmitted by the first broadcast station at a location outside the service area of the first broadcast station;
and in response to the monitoring, controlling a field strength determining property of the first broadcast station in a manner that causes the first broadcast station to provide a field strength greater than a threshold field strength within the service area of the first broadcast station yet prevents a $99^{th}$ percentile propagation boundary of the first broadcast station from entering the service area of the second broadcast station notwithstanding changes in propagation conditions.

2. The method of claim 1, in which the controlling comprises controlling effective radiated power of the first broadcast station.

3. The method of claim 1, in which: the first broadcast station has an average energy consumption and a maximum energy consumption; and the controlling reduces the average power consumption below the maximum energy consumption.

4. The method of claim 1 in which the controlling comprises controlling a directional characteristic of the first broadcast station.

5. The method of claim 1 in which the directional characteristic comprises an elevation component.

6. The method of claim 1, in which the monitoring and the controlling are performed substantially in real time.

7. The method of claim 1, in which the monitoring comprises monitoring the field strength of the signal transmitted by the first broadcast station at locations at different distances from the first broadcast station.

8. The method of claim 1, in which the monitoring comprises monitoring the field strength of the signal transmitted by the first broadcast station at locations at different bearings from the first broadcast station.

9. The method of claim 1, in which the monitoring additionally comprises monitoring the field strength of the signal transmitted by the first broadcast station at a location inside the service area of the first broadcast station.

10. The method of claim 1, in which the monitoring additionally comprises monitoring the field strength of the signal broadcast by the second broadcast station.

11. The method of claim 10, additionally comprising controlling a field strength determining property of the second broadcast station.

12. The method of claim 10, in which the monitoring comprises monitoring the field strength of the signal broadcast by the first broadcast station and monitoring the field strength of the signal broadcast by the second broadcast station at a common location.

13. The method of claim 12, in which the common location is outside the service areas of both broadcast stations.

14. A system for reducing minimum distance separation between a first broadcast station and a second broadcast station transmitting in the same channel without exceeding a specified level of co-channel interference in the service areas of the broadcast stations, the system comprising:
a field strength monitor operable to measure the field strength of the signal transmitted by the first broadcast station wherein the field strength monitor is configured to measure the field strength of the signal transmitted by the first broadcast station at a location outside the service area of the first broadcast station; and
a controller operable in response to the field strength monitor to control a field strength determining property of the first broadcast station in a manner that causes the first broadcast station to provide a field strength greater than a threshold field strength within the service area of the first broadcast station yet prevents a $99^{th}$ percentile propagation boundary of the first broadcast station from entering the service area of the second broadcast station notwithstanding changes in propagation conditions.

15. The system of claim 14, in which the field strength determining property comprises effective radiated power.

16. The system of claim 14, in which: the first broadcast station has an average energy consumption and a maximum energy consumption; and the controller controlling the field strength determining property of the first broadcast station reduces the average power consumption below the maximum energy consumption.

17. The system of claim 14, in which: the first broadcast station comprises an antenna; and the field strength determining property comprises a directional characteristic of the antenna.

18. The system of claim 14, in which the directional characteristic of the antenna comprises an elevational component.

19. The system of claim 14, in which the field strength monitor comprises: the receiver comprising an input; and a directional antenna coupled to the input of the receiver, the antenna directed towards the first broadcast station.

20. The system of claim 19, in which the directional antenna has a directional pattern comprising a null directed towards the second broadcast station.

21. The system of claim 14, additionally comprising an additional field strength monitor responsive to the signal transmitted by the second broadcast station; and an additional controller operable in response to the additional field strength monitor to control a field strength determining property of the second broadcast station.

22. The system of claim 14, in which: the system additionally comprises additional field strength monitors responsive to the signal transmitted by the first broadcast station; and the controller is operable in response to the field strength monitor and the additional field strength monitors to control a field strength determining property of the first broadcast station, wherein at least one of the additional field strength monitors is configured to monitor the field strength of a signal transmitted by the first broadcast station at a location inside the service area of the first broadcast station.

23. The system of claim 21, in which the field strength monitors are at different distances from the first broadcast station.

24. The system of claim 21, in which the field strength monitors have different bearings from the first broadcast station.

25. The method of claim 1, in which the first broadcast station and the second broadcast station are separated by a distance less than a government-mandated minimum distance for broadcast stations having fixed field strength determining properties.

26. The system of claim 14, in which the first broadcast station and the second broadcast station are separated by a distance less than a government-mandated minimum distance for broadcast stations having fixed field strength determining properties.

* * * * *